United States Patent
Take et al.

(10) Patent No.: US 12,386,212 B2
(45) Date of Patent: Aug. 12, 2025

(54) ELECTRO-OPTICAL DEVICE INCLUDING OPTICAL WAVEGUIDE WITH SLOPE CHANGE POINT

(71) Applicant: TDK CORPORATION, Tokyo (JP)

(72) Inventors: Hiroshi Take, Hong Kong (CN); Kenji Nagase, Hong Kong (CN); Anthony Reymund Melad Binarao, Hong Kong (CN); Cheng Bu Heng, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 219 days.

(21) Appl. No.: 17/707,117

(22) Filed: Mar. 29, 2022

(65) Prior Publication Data

US 2022/0326554 A1    Oct. 13, 2022

(30) Foreign Application Priority Data

Mar. 30, 2021    (CN) .......................... 202110341969.5
Mar. 24, 2022    (CN) .......................... 202210295016.4

(51) Int. Cl.
 *G02F 1/035* (2006.01)
 *G02F 1/21* (2006.01)
 *G02F 1/225* (2006.01)

(52) U.S. Cl.
 CPC .............. *G02F 1/035* (2013.01); *G02F 1/212* (2021.01); *G02F 1/225* (2013.01); *G02F 2202/20* (2013.01)

(58) Field of Classification Search
 CPC ........ G02F 1/035; G02F 1/212; G02F 1/2255; G02F 2201/063; G02F 2202/20; G02F 1/225; G02B 2006/12097
 See application file for complete search history.

(56) References Cited

U.S. PATENT DOCUMENTS

| | | | |
|---|---|---|---|
| 5,129,017 A | 7/1992 | Kawano et al. | |
| 6,532,324 B2 | 3/2003 | Lupu et al. | |
| 8,582,927 B1 | 11/2013 | Thaniyavarn | |
| 9,946,100 B2 | 4/2018 | Yanagawa et al. | |
| 12,135,456 B2* | 11/2024 | Bian | G02B 6/305 |
| 2002/0048433 A1* | 4/2002 | Wu | G02B 6/30 385/39 |
| 2002/0106141 A1 | 8/2002 | Gopalakrishnan | |

(Continued)

FOREIGN PATENT DOCUMENTS

| | | |
|---|---|---|
| JP | S64-048021 A | 2/1989 |
| JP | H108-016746 B2 | 2/1996 |

(Continued)

OTHER PUBLICATIONS

"Chamfer, N., Sense 2." Jul. 2023, Oxford English Dictionary, Oxford UP, https://doi.org/10.1093/OED/9800032942. (Year: 2023).*

*Primary Examiner* — Thomas A Hollweg
*Assistant Examiner* — Kirsten D. Endresen
(74) *Attorney, Agent, or Firm* — Oliff PLC

(57) ABSTRACT

An electro-optical device includes a substrate, an optical waveguide formed on the substrate, a buffer layer formed on the substrate which is provided so as to cover the optical waveguide and an electrode formed on the buffer layer, when viewed in a propagation direction of light, a side surface of the optical waveguide has at least one slope change point. An electro-optical device can reduce the driving voltage and the propagation loss of light.

13 Claims, 6 Drawing Sheets

(56) References Cited

U.S. PATENT DOCUMENTS

| | | | |
|---|---|---|---|
| 2004/0028334 A1 | 2/2004 | Marazzi et al. | |
| 2005/0152658 A1* | 7/2005 | Keyser | G02B 6/132 385/129 |
| 2019/0271897 A1* | 9/2019 | Iwatsuka | G02B 6/126 |
| 2020/0218126 A1 | 7/2020 | Iwatsuka et al. | |
| 2020/0310170 A1 | 10/2020 | Iwatsuka et al. | |

FOREIGN PATENT DOCUMENTS

| | | | |
|---|---|---|---|
| JP | 3149088 B2 | | 3/2001 |
| JP | 2004-226471 A | | 8/2004 |
| JP | 2006-195383 A | | 7/2006 |
| JP | 2006-317550 A | | 11/2006 |
| JP | 2007-199500 A | | 8/2007 |
| JP | 4485218 B2 | | 6/2010 |
| JP | 2012-078375 A | | 4/2012 |
| JP | 2014-142411 A | | 8/2014 |
| JP | 2015-014715 A | | 1/2015 |
| JP | 2015230466 A | * | 12/2015 |
| JP | 5853880 B2 | | 2/2016 |
| JP | 2019-074595 A | | 5/2019 |
| WO | 2019/039215 A1 | | 2/2019 |
| WO | 2019/069815 A1 | | 4/2019 |

\* cited by examiner

ELECTRO-OPTICAL DEVICE INCLUDING OPTICAL WAVEGUIDE WITH SLOPE CHANGE POINT

FIELD

The present invention relates to an electro-optical device used in the fields of optical communication and optical measurement.

BACKGROUND

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

As an optical modulator used in external modulation methods, an optical modulator using an optical waveguide formed of lithium niobate (LiNbO3, hereinafter referred to as "LN") has the advantages of high speed, low loss and less distortion of controlling light waveform. However, compared with semiconductor optical devices, it has the disadvantages of large driving voltage etc.

In order to overcome the above disadvantages, it is known that an optical modulator with low driving voltage can be realized by using an optical waveguide with a LN film formed by applying thin film technology on a sapphire substrate (see patent documents 1 and 2). In addition, it is known that an optical waveguide element with reduced driving voltage can be realized by arranging a film with a high refractive index in the lower portion of the optical waveguide.

However, in the optical modulator using thin film technology and the optical waveguide element arranging a film with a high refractive index described above, when the driving voltage reduces, the propagation loss increases.

CITATION LIST

Patent Document

Patent Document 1: JP 2006-195383A
Patent Document 2: JP 2014-6348A
Patent Document 3: JP 2012-078375A

SUMMARY

The present invention is the result of intensive research in view of the above problems, and its object is to provide an electro-optical device that can reduce the driving voltage and the propagation loss of light.

The inventors of the present invention have conducted in-depth research on the mechanism of the driving voltage of the electro-optical device and the propagation loss of light, and as a result, they have discovered the following new insights that are hard to come up with until now by those skilled in the art: (1) Ideally, the cross-section of the optical waveguide when viewed in the propagation direction of light (i.e. the cross-section perpendicular to the propagation direction of light) is desired to be a circular shape; (2) In existing optical waveguides, the above cross-section of the optical waveguide is usually a trapezoidal or quadrilateral shape, and light easily leak to corners of these shapes so that the propagation loss PL(dB/cm) increases; (3) The narrower the width of the upper portion of the optical waveguide is, the more concentrated the electric field is, the better the indicator of the efficiency of the electric field $V\pi(V)@1550$ nm is, and the lower the driving voltage is. However, considering that the width of the upper portion of the optical waveguide is too narrow, the light will be guided outside the optical waveguide formed of LN, the electro-optical effect will be reduced, the scattering loss caused by rough surfaces will increase and the driving voltage will increase. Therefore, as long as the driving voltage can be maintained, the width of the upper portion of the optical waveguide is preferable to be not too narrow. Thus, according to the above new insights, the inventors of the present invention tried to improve the cross-sectional shape of the optical waveguide. However, since the optical waveguide is usually formed by dry etching, the cross-section of the optical waveguide is difficult to be an ideal circular shape due to process problems etc. Therefore, the inventors of the present invention have thought of making the side surface of the optical waveguide have at least one slope change point when viewed in the propagation direction of light in such a way that the width of the optical waveguide gradually narrows toward the upper portion (i.e. making the side surface of the optical waveguide is composed of multiple straight lines with different slopes when viewed in the propagation direction of light) to make the cross-section of the optical waveguide approximate to a circular shape, which can reduce the driving voltage and the propagation loss of light until the present invention is completed.

That is, the electro-optical device according to one aspect of the present invention comprises a substrate, an optical waveguide formed on the substrate, a buffer layer formed on the substrate which is provided so as to cover the optical waveguide, and an electrode formed on the buffer layer, when viewed in a propagation direction of light, a side surface of the optical waveguide has at least one slope change point.

In this electro-optical device, when viewed in the propagation direction of light, the side surface of the optical waveguide has at least one slope change point. In other words, when viewed in the propagation direction of light, the side surface of the optical waveguide is composed of multiple straight lines with different slopes. Thus, the slopes of the upper portion and the lower portion of the side surface of the optical waveguide are different to narrow the width of the upper portion of the optical waveguide to reduce the driving voltage, and the cross-section of the optical waveguide can be approximately a circular shape to reduce the propagation loss of light.

In addition, in the above electro-optical device according to one aspect of the present invention, it can also be that when viewed in a propagation direction of light, an angle formed by a lower side surface of the optical waveguide and an upper surface of the substrate is 60 degrees or more.

In addition, in the above electro-optical device according to one aspect of the present invention, it can also be that a width of an uppermost portion of the optical waveguide is 40%-75% of a width of a lowest portion.

In addition, in the above electro-optical device according to one aspect of the present invention, it can also be that when viewed in a propagation direction of light, an angle formed by a side surface of the uppermost segment of the optical waveguide and an upper surface of the substrate is larger than 0 degree and is 80 degrees or less.

In addition, in the above electro-optical device according to one aspect of the present invention, it can also be that there are a plurality of slope change points.

In addition, in the above electro-optical device according to one aspect of the present invention, it can also be that the optical waveguide is a film composed of $LiNbO_3$ or $LiTaO_3$.

In addition, in the above electro-optical device according to one aspect of the present invention, it can also be that the optical waveguide is a film formed by doping $LiNbO_3$ with at least one element selected from Ti, Mg, Zn, In, Sc, Er, Tm, Yb and Lu.

In addition, in the above electro-optical device according to one aspect of the present invention, it can also be that the optical waveguide is an epitaxial film.

In addition, in the above electro-optical device according to one aspect of the present invention, it can also be that the epitaxial film is oriented along a direction intersecting with the substrate.

According to one aspect of the present invention, an electro-optical device which can reduce the driving voltage and the propagation loss of light is provided.

BRIEF DESCRIPTION OF THE DRAWINGS

FIG. 1(b) illustrates the whole body of the optical modulator including traveling wave electrodes.

DETAILED DESCRIPTION OF THE EMBODIMENT(S)

Hereinafter, preferable embodiments of the present invention will be described in detail with reference to the accompanying drawings. Herein, in the description of the accompanying drawings, the same or equivalent elements are marked with the same symbols, and repeated descriptions are omitted.

First Embodiment

Figure 1A:
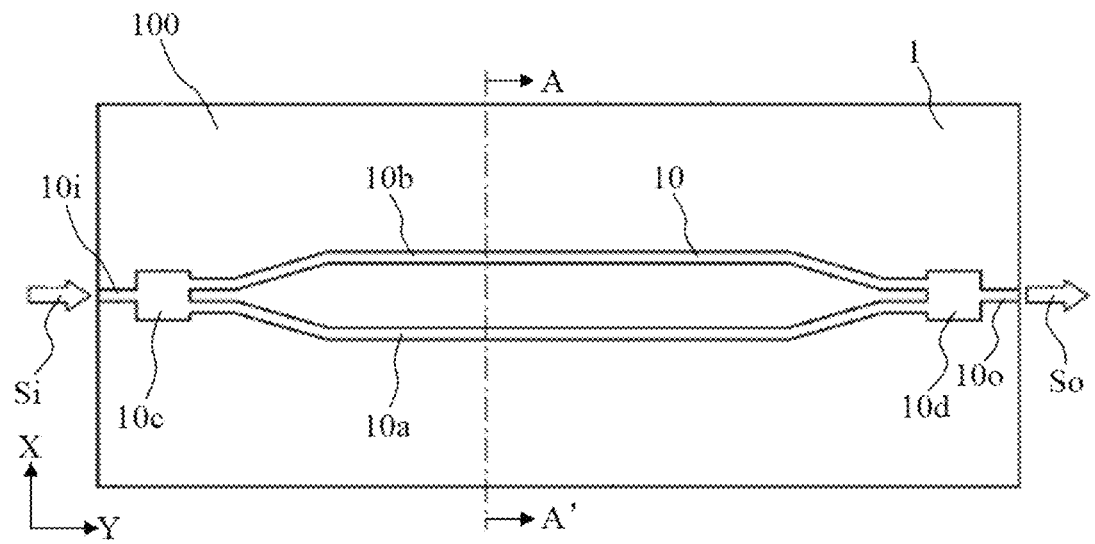
FIG. 1(a) and FIG. 1(b) are top views of the optical modulator 100 according to the first embodiment of the present invention, and FIG. 1(a) only illustrates the optical waveguide.
Figure 1B:
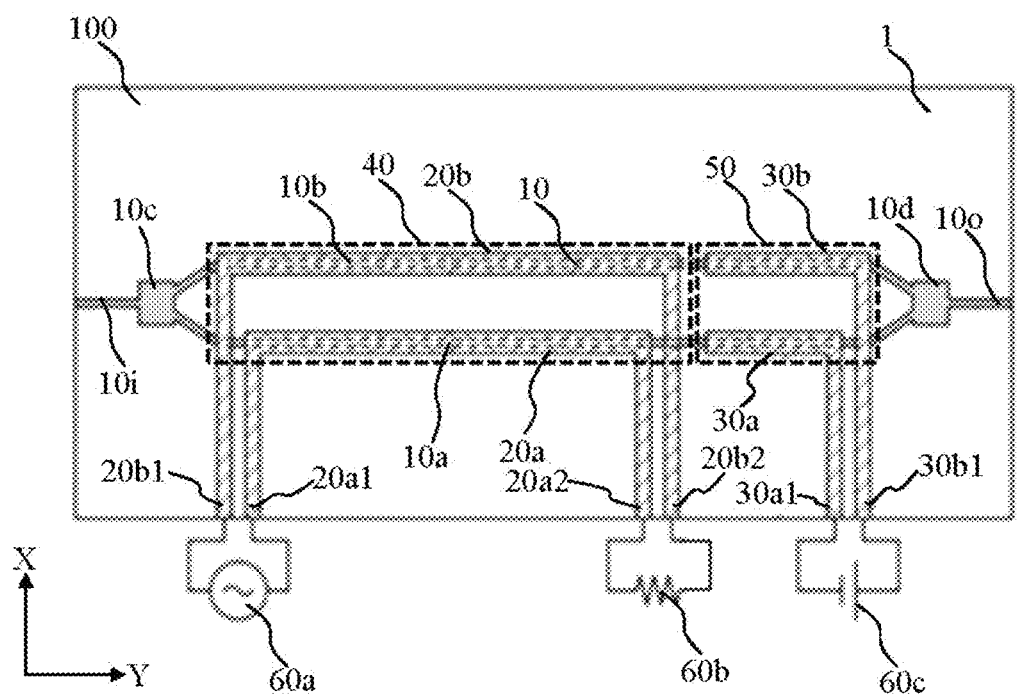

FIG. 1(a) and FIG. 1(b) are top views of optical modulator 100 according to the first embodiment of the present invention, FIG. 1(a) only illustrates the optical waveguide, and FIG. 1(b) illustrates the whole body of the optical modulator including the traveling wave electrode. As illustrated in FIG. 1(a) and FIG. 1(b), optical modulator 100 comprises: Mach-Zehnder optical waveguide 10 which has first and second optical waveguides 10a and 10b formed on substrate 1 and arranged parallel to each other, first signal electrode 20a arranged along first optical waveguide 10a, second signal electrode 20b arranged along second optical waveguide 10b, first bias electrode 30a arranged along first optical waveguide 10a and second bias electrode 30b arranged along second optical waveguide 10b. First signal electrode 20a and second signal electrode 20b together with first optical waveguide 10a and second optical waveguide 10b constitute RF interaction portion 40 of the Mach-Zehnder optical modulator. First bias electrode 30a and second bias electrode 30b together with first optical waveguide 10a and second optical waveguide 10b constitute DC interaction portion 50 of the Mach-Zehnder optical modulator.

Mach-Zehnder optical waveguides 10 are optical waveguides having a structure of Mach-Zehnder interferometer. There are first and second optical waveguides 10a and 10b branched from one input optical waveguide 10i by branch portion 10c, and first and second optical waveguides 10a and 10b are converged in one output optical waveguide 10o via multiplexing portion 10d. After input light Si is branched in branch portion 10c and travels through first and second optical waveguides 10a and 10b, it is multiplexed in multiplexing portion 10d and output from output optical waveguide 10o as modulation light So.

First and second signal electrodes 20a, 20b are linear electrode patterns overlapping first and second waveguides 10a, 10b in the plan view, and both ends thereof extend to electrode pads provided near the end face of substrate 1. That is, one ends 20a1 and 20b1 of first signal electrode 20a and second signal electrode 20b are drawn out to electrode pads provided near the end face of substrate 1 to form a signal input port, and driving circuit 60a is connected to the signal input port. Further, the other ends 20a2 and 20b2 of first signal electrode 20a and second signal electrode 20b are drawn out to electrode pads provided near the end face of substrate 1 and are connected to each other via terminating resistor 60b. Thus, first and second signal electrodes 20a and 20b function as differential coplanar traveling wave electrodes.

First and second bias electrodes 30a and 30b are independent of first and second signal electrodes 20a and 20b in order to apply a DC voltage (DC bias voltage) to first and second waveguides 10a and 10b. One ends 30a1 and 30b1 of first bias electrode 30a and second bias electrode 30b are drawn out to electrode pads provided near the end face of substrate 1 to form a DC bias voltage input port, and bias circuit 60c is connected to the DC bias port. In the present embodiment, the formation regions of first bias electrode 30a and second bias electrode 30b are disposed closer to the side of the output end of Mach-Zehnder optical waveguide 10 than the formation regions of first signal electrode 20a and second signal electrode 20b. However, it can also be provided on the input side.

As described above, first and second signal electrodes 20a and 20b apply the RF signal to first and second waveguides 10a and 10b, and first and second bias electrodes 30a and 30b apply the DC bias voltage to first and second waveguides 10a and 10b.

The differential signal (the modulation signal) having the same absolute value but different positive and negative is input to one ends of first and second signal electrodes 20a, 20b. Since first and second optical waveguides 10a and 10b are formed of materials with electro-optical effects such as lithium niobate, according to the electric field imparted to first and second optical waveguides 10a and 10b, the refractive index of first and second optical waveguides 10a and 10b changes as $+\Delta n$ and $-\Delta n$ respectively, and the phase difference between a pair of optical waveguides 10a and 10b changes. The signal light modulated by the change of the phase difference is output from output optical waveguide 10o.

In this embodiment, first and second optical waveguides 10a and 10b are films composed of $LiNbO_3$, but are not limited to this. First and second optical waveguides 10a and 10B can also be films composed of $LiTaO_3$ or films formed doping $LiNbO_3$ with at least one element selected from Ti, Mg, Zn, In, Sc, Er, Tm, Yb and Lu.

In this embodiment, first and second optical waveguides 10a and 10b are epitaxial films Preferably, the epitaxial film is oriented along a direction intersecting with substrate 1.

Figure 2:
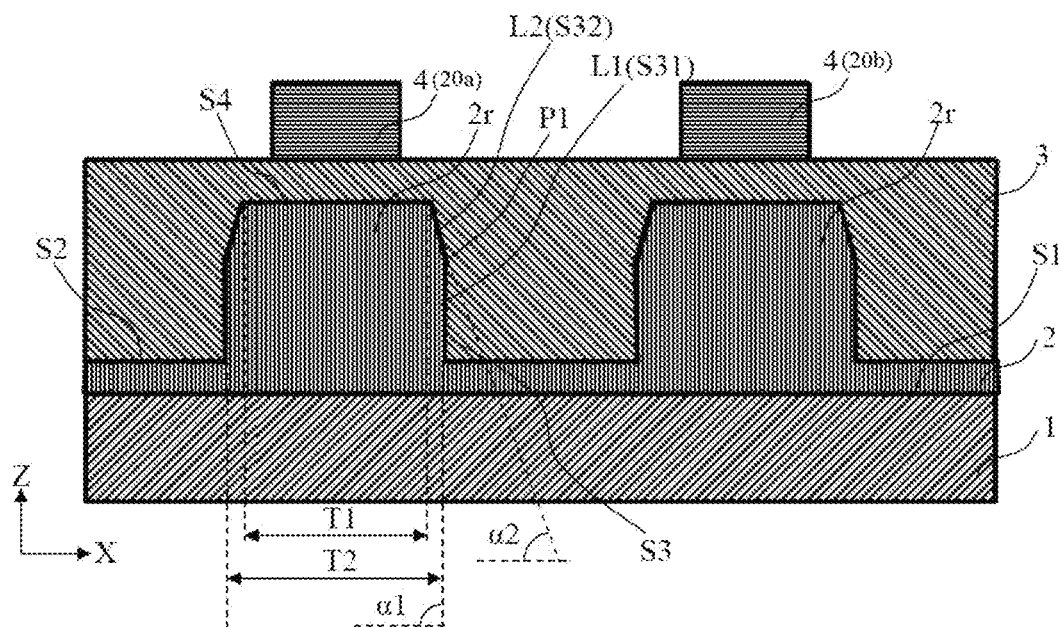
FIG. 2 is a cross-sectional view of the optical modulator 100 according to the first embodiment of the present invention taken along line A-A' which passes through any position of the optical waveguide and is perpendicular to the propagation direction of light at that position.

FIG. 2 is a cross-sectional view of the optical modulator 100 according to the first embodiment of the present invention taken along line A-A' which passes through any position of the optical waveguide and is perpendicular to the propagation direction of light at that position. As shown in FIG. 2, optical modulator 100 has a multilayer structure in which substrate 1, waveguide layer 2, buffer layer 3 and electrode layer 4 are laminated in this order. Substrate 1 is, for example, a sapphire substrate. Waveguide layer 2 made of electro-optical material represented by lithium niobate ($LiNbO_3$, hereinafter, referred to as "LN") is formed on the surface of substrate 1. Waveguide layer 2 has first and second optical waveguides 10a and 10b composed of ridge portion 2r.

Buffer layer 3 is a layer formed on substrate 1 by covering the entire surface of the region where the ridge portion is not formed in upper surface S2 of waveguide layer 2 and side surface S3 and upper surface S4 of ridge portion 2r so as to prevent the light propagating in first and second optical waveguides 10a and 10b from being absorbed by electrodes 20a and 20b. Buffer layer 3 only needs to function as an intermediate layer between the optical waveguide and the electrode, and the material of buffer layer 3 can be widely selected as long as it is a non-metal. For example, buffer layer 3 can use a ceramic layer composed of insulating materials such as metal oxides, metal nitrides and metal carbides. The material of buffer layer 3 can be a crystalline material or an amorphous material. Buffer layer 3 is preferably formed of a material with a lower refractive index and higher transparency than waveguide layer 2. For example, $Al_2O_3$, $SiO_2$, $LaAlO_3$, $LaYO_3$, $ZnO$, $HfO_2$, $MgO$, $Y_2O_3$ etc. can be used. The thickness of buffer layer 3 formed on the optical waveguide can be about 0.2 to 1.2 μm. In the present embodiment, buffer layer 3 not only covers upper surfaces S4 of first and second optical waveguides 10a and 10b, but also covers the entire surface of the region where ridge portion 2r is not formed in upper surface S2 of waveguide layer 2 and side surface S3 of ridge portion 2r. However, as long as buffer layer 3 is formed at least on upper surface S4 of ridge portion 2r of waveguide layer 2, and buffer layer 3 can also be patterned by selectively only covering the vicinity of upper surface S4 of first and second optical waveguides 10a and 10b.

In order to reduce the light absorption of the electrode, the film thickness of buffer layer 3 can be as large as possible, and in order to apply a high electric field to first and second optical waveguides 10a and 10b, the film thickness of buffer layer 3 can be as small as possible. Since the light absorption of the electrode and the applied voltage of the electrode are trade-off, it is necessary to set an appropriate film thickness according to the purpose. The higher the dielectric constant of the buffer layer 3, the more $V\pi(V)@1550$ nm as an indicator of electric field efficiency can be reduced. Therefore, it is preferable. The lower the refractive index is, the thinner the buffer layer 3 can be. Therefore, it is preferable. Generally, because the refractive index of the material with a high dielectric constant is also high, considering the balance between the two, it is important to select a material with a high dielectric constant and a relatively low refractive index. As an example, $Al_2O_3$ has a relative dielectric constant of about 9 and a refractive index of about 1.6, which is a preferable material. $LaAlO_3$ has a relative dielectric constant of about 13 and a refractive index of about 1.7, and additionally, $LaYO_3$ has a relative dielectric constant of about 17 and a refractive index of about 1.7, which is a particularly preferable material.

Electrode layer 4 is arranged on buffer layer 3. Electrode layer 4 is provided with first and second signal electrodes 20a and 20b and first and second bias electrodes 30a and 30b. First and second signal electrodes 20a and 20b and first and second bias electrodes 30a and 30b are provided overlapping ridge portion 2r corresponding to first and second optical waveguides 10a and 10b respectively, and are opposite to first and second optical waveguides 10a and 10b via buffer layer 3.

Waveguide layer 2 is not particularly limited as long as it is formed of electro-optical materials, but it is preferable to be formed of lithium niobate ($LiNbO_3$). This is because lithium niobate has a large electro-optical constant and is suitable as a constituent material of optical devices such as optical modulators. Hereinafter, the structure of the present embodiment when waveguide layer 2 is set as a lithium niobate film is described in detail.

Substrate 1 is not particularly limited as long as it has a lower refractive index than the lithium niobate film, but it is preferable a substrate on which a lithium niobate film can be formed as an epitaxial film, and a sapphire single crystal substrate or a silicon single crystal substrate is preferable. The crystal orientation of the single crystal substrate is not particularly limited. The lithium niobate film has properties such as being easily formed as a c-axis-oriented epitaxial film with respect to single crystal substrates of various crystal orientations. Since the c-axis oriented lithium niobate film has triple symmetry, it is preferable that the single crystal substrate of the base also has the same symmetry. Thus, the single-crystal sapphire substrate preferably has a c-plane, and the single-crystal silicon substrate preferably has a (111) surface.

The term "epitaxial film", as used herein, refers to a film whose crystal orientation is aligned with respect to the underlying substrate or film. When the film plane is set to the X-Y plane and the film thickness direction is set to the Z-axis, the crystals are aligned in the X-axis, Y-axis, and Z-axis directions. For example, the existence of an epitaxial film can be confirmed by first measuring the peak intensity at the orientation position by 2θ-θ X-ray diffraction and second confirming poles.

Specifically, first, in the 2θ-θX-ray diffraction measurement, all the peak intensities except for the target plane must be 10% or less, preferably 5% or less, of the maximum peak intensity on the target plane. For example, in a c-axis oriented epitaxial lithium niobate film, the peak intensities except for a (00L) plane are 10% or less, preferably 5% or less, of the maximum peak intensity on the (00L) plane. (00L) is a general term for (001), (002) and other equivalent planes.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNbA_yO_z$. A denotes an element other than Li, Nb and O. The number x ranges from 0.5 to 1.2, preferably 0.9 to 1.05. The number y ranges from 0 to 0.5. The number z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, Ce etc., alone or in combination.

The lithium niobate film preferably has a thickness of equal to or smaller than 2 μm. This is because a high-quality lithium niobate film having a thickness larger than 2 μm is difficult to form. The lithium niobate film having an excessively small thickness cannot completely confine light, allowing light to leak to substrate 1 or buffer layer 3. Even if an electric field is applied to the lithium niobate film, there is also a concern that the change in the effective refractive index of first and second optical waveguides 10a and 10b becomes smaller. Thus, the lithium niobate film preferably has a thickness that is at least approximately one-tenth of the wavelength of light to be used.

It is desirable to form the lithium niobate film by a film forming method such as sputtering, CVD or sol-gel process. If the c-axis of the lithium niobate film is oriented perpendicular to the main surface of the single-crystal substrate, an electric field is applied parallel to the c-axis, thereby changing the optical refractive index in proportion to the intensity of the electric field. If the single-crystal substrate is sapphire, the lithium niobate film is formed by epitaxial growth directly on the sapphire single-crystal substrate. If the single-crystal substrate is silicon, the lithium niobate film is formed by epitaxial growth on a cladding layer (not shown) formed on the substrate. The cladding layer (not shown) is made of material which has a lower refractive index than the lithium niobate film and should be suitable for epitaxial growth. For example, if the cladding layer (not shown) is made of $Y_2O_3$, a lithium niobate film of high quality can be formed.

As a formation method for the lithium niobate film, there is known a method of thinly polishing or slicing the lithium niobate single crystal substrate. This method is advantageous in that the same characteristics as the single crystal can be obtained and can be applied to the present invention.

In the present embodiment, as illustrated in FIG. 2, when viewed in the propagation direction of light, that is, in the cross-sectional view taken by the A-A' line passing through any position in the Y-axis direction of optical waveguide 10a (10b) and perpendicular to the propagation of light at this position, side surface S3 of ridge portion 2r has one slope change point P1. In other words, when viewed in the propagation direction of light, that is, in the cross-sectional view taken by A-A' line passing through any position in the Y-axis direction of the optical waveguide 10a (10b) and perpendicular to the propagation of light at this position, side surface S3 of ridge portion 2r is composed of two straight lines L1 and L2 with different slopes.

In this way, the slopes of the upper and lower portions of the side surfaces of the ridge portion can be made different to make the width of the upper portion of the ridge portion narrower than the width of the lower portion so that the driving voltage is reduced, and the cross-section of the ridge portion can be approximately a circular shape to reduce the light propagation loss.

In addition, when viewed in the propagation direction of light, that is, in the cross-sectional view taken by A-A' line passing through any position in the Y-axis direction of optical waveguide 10a (10b) and perpendicular to the propagation of light at this position, Angle α1 formed by the side surface of the lowest segment of ridge portion 2r (also known as "the lower side surface". It is the same in the following description) and upper surface S1 of substrate 1 is preferably 60 degrees or more and 90 degrees or less. Also, the so-called angle α1 refers to the angle of the inner side of the ridge portion side when the extension line of the side surface of the lowest segment of the ridge portion crosses a straight line parallel to the upper surface of the substrate at the cross-section. About the definition of angle α1, it is the same in the following description.

In addition, when viewed in the propagation direction of light, that is, in the cross-sectional view taken by A-A' line passing through any position in the Y-axis direction of optical waveguide 10a (10b) and perpendicular to the propagation of light at this position, angle α2 formed by side surface S32 of the uppermost segment of ridge portion 2r and upper surface S1 of substrate 1 is preferably greater than 0 degree and is 80 degrees or less. Also, the so-called angle α2 refers to the angle of the inner side of the ridge portion side when the extension line of the side surface of the uppermost segment of the ridge portion crosses a straight line parallel to the upper surface of the substrate at the cross-section. About the definition of angle α2, it is the same in the following description.

In this way, optical waveguide 10*a* (10*b*) stands steeply in a straight line or roughly perpendicular from the side of substrate 1, and then the slope of the side surface with one slope change point changes. In this way, the upper segment part has a plurality of slope change points and reaches the top surface of the optical waveguide slowly.

In addition, angle α1 formed by lower side surface S31 of ridge portion 2*r* and upper surface S1 of substrate 1 is larger than angle α2 formed by side surface S32 of the uppermost segment of ridge portion 2*r* and upper surface S1 of substrate 1. In other words, the angle formed by each of lower side surface S31 and upper side surface S32 and upper surface S1 of substrate 1 becomes smaller as it goes up.

In addition, when viewed in the propagation direction of light, that is, in the cross-sectional view taken by A-A' line passing through any position in the Y-axis direction of optical waveguide 10*a* (10*b*) and perpendicular to the propagation of light at this position, the width T1 of the uppermost portion of ridge portion 2*r* is smaller than the width T2 of the lowest portion of ridge portion 2*r*, and is preferable 40%-75% of the width T2 of the lowest portion. In addition, the so-called width T1 of the uppermost portion of ridge portion 2*r* refers to the length of the upper side of the trapezoid when the upper part of ridge portion 2*r* is trapezoid. The definition of the width of the uppermost portion of the ridge is the same in the following description.

Modification of the First Embodiment

Figure 3:
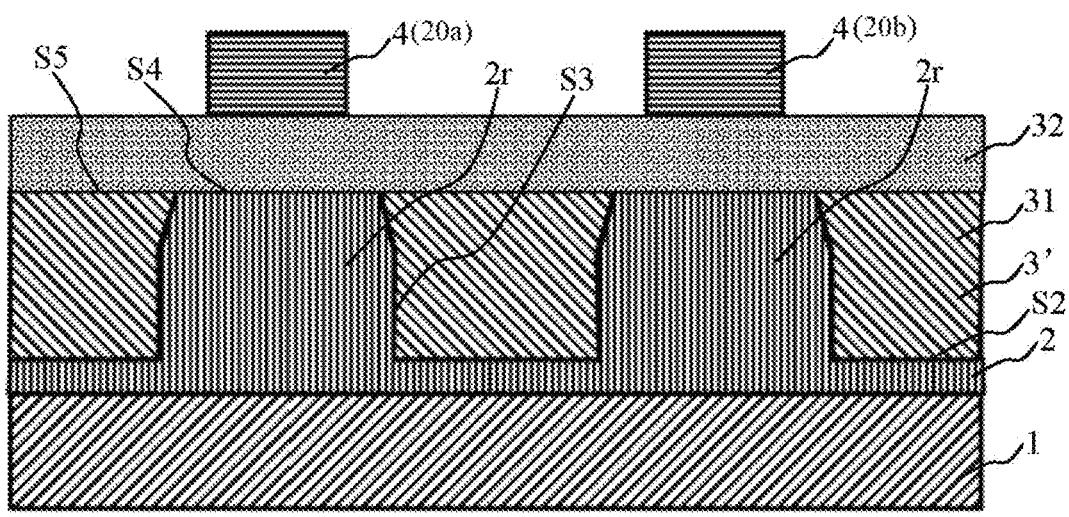
FIG. 3 is a cross-sectional view of an optical modulator corresponding to FIG. 2 according to a modification of the first embodiment of the present invention.

FIG. 3 is a cross-sectional view of an optical modulator according to a modification of the first embodiment of the present invention corresponding to FIG. 2. In the first embodiment, the example, that upper surface S4 and side surface S3 of ridge portion 2*r* are covered with buffer layer 3 made of the same material, is given. However, it is not limited to this. The material of the buffer layer covering upper surface S4 of ridge portion 2*r* can also be different from the material of the buffer layer covering side surface S3 of ridge portion 2*r* as shown in FIG. 3.

That is, as illustrated in FIG. 3, buffer layer 3' according to this modification includes first buffer layer 31 and second buffer layer 32. First buffer layer 31 is formed between ridge portion 2*r* and on upper surface S2 of waveguide layer 2. Second buffer layer 32 is formed on upper surface S5 of first buffer layer 31 and upper surface S4 of ridge portion 2*r*. The material of first buffer layer 31 is different from the material of second buffer layer 32. In this way, the light propagation loss can be reduced more effectively by making the material of the first buffer layer and the material of the second buffer layer different from each other.

Second Embodiment

Figure 4:
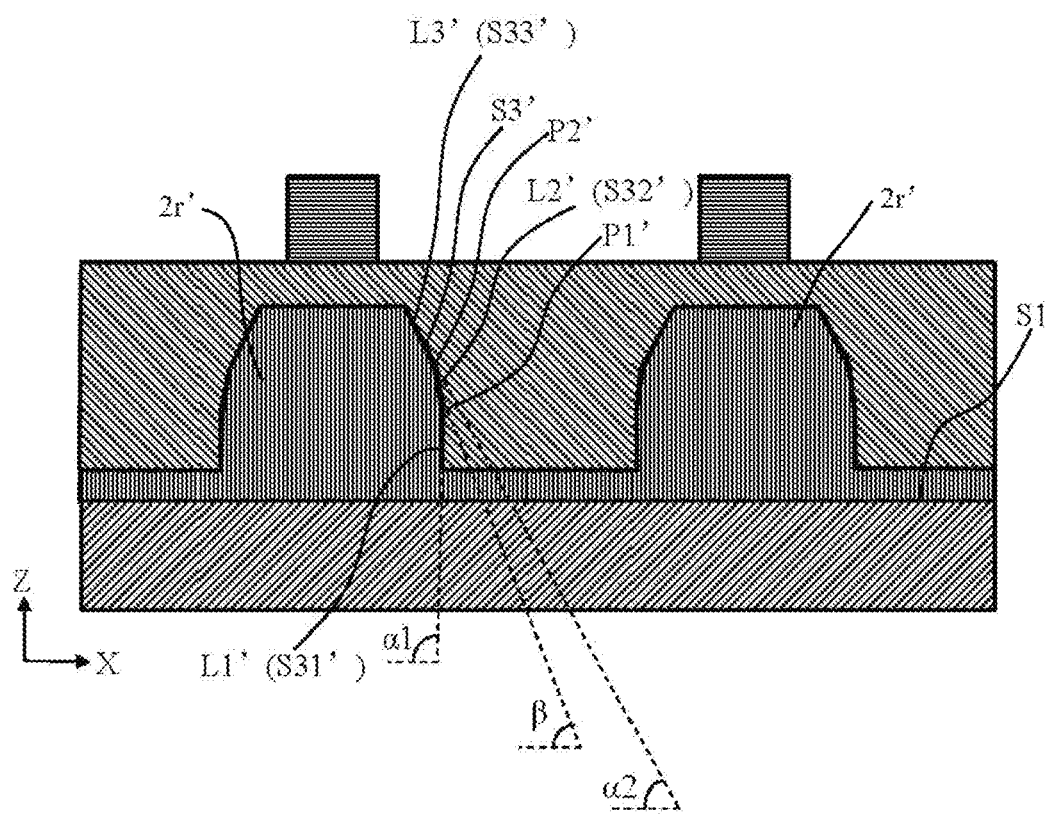
FIG. 4 is a cross-sectional view of an optical modulator corresponding to FIG. 2 according to the second embodiment of the present invention.
Figure 5:
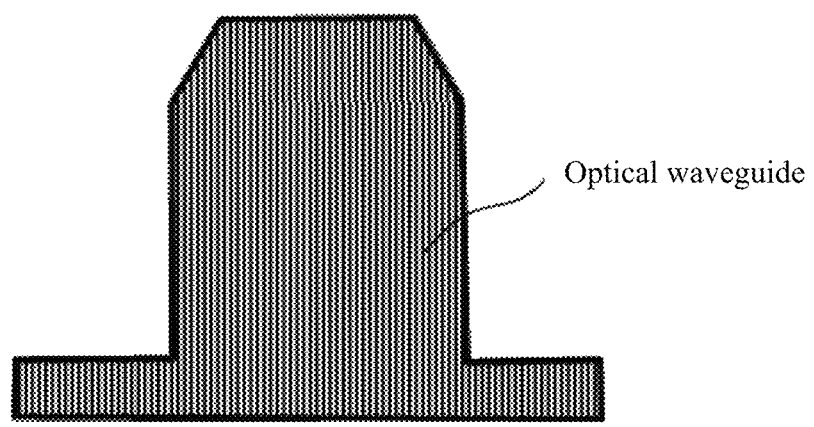
FIG. 5 is a cross-sectional view showing the cross-sectional shape of the optical waveguide of Example 1 of the present invention.
Figure 6:
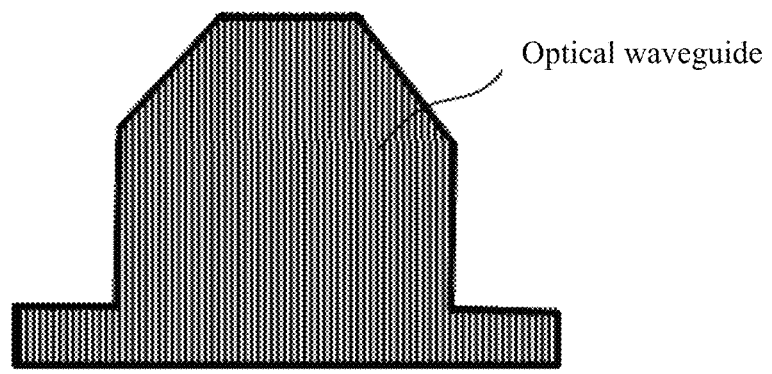
FIG. 6 is a cross-sectional view showing the cross-sectional shape of the optical waveguide of Example 2 of the present invention.

FIG. 4 is a cross-sectional view of an optical modulator corresponding to FIG. 2 according to the second embodiment of the present invention. The optical modulator according to the second embodiment is different from the optical modulator according to the first embodiment only in that the shape of ridge portion 2*r'* is different from the shape of the optical modulator according to the first embodiment, and the other structures are the same as the optical modulator according to the first embodiment, so its illustration is omitted.

Specifically, as illustrated in FIG. 4, when viewed in the propagation direction of light, that is, in the cross-sectional view taken by A-A' line passing through any position in the Y-axis direction of the optical waveguide and perpendicular to the propagation of light at this position, side surface S3' of ridge portion 2*r'* has a plurality of (here, 2) slope change points P1' and P2'. In other words, when viewed in the propagation direction of light, that is, in the cross-sectional view taken by A-A' line passing through any position in the Y-axis direction of the optical waveguide and perpendicular to the propagation of light at this position, side surface S3' of ridge portion 2*r'* is composed of three straight lines L1', L2' and L3' with different slopes.

In addition, when viewed in the propagation direction of light, that is, in the cross-sectional view taken by A-A' line passing through any position in the Y-axis direction of the optical waveguide and perpendicular to the propagation of light at this position, angle α1 formed by lower side surface S31' of ridge portion 2*r'* and upper surface S1 of substrate 1 is preferably 60 degrees or more and 90 degrees or less.

In addition, when viewed in the propagation direction of light, that is, in the cross-sectional view taken by A-A' line passing through any position in the Y-axis direction of the optical waveguide and perpendicular to the propagation of light at this position, angle β formed by side surface S32' of the second segment of ridge portion 2*r'* and upper surface S1 of substrate 1 is preferably greater than 0 degree and is 80 degrees or less. Also, the so-called angle β refers to the angle of the inner side of the ridge portion side when the extension line of the side surface of the second segment of the ridge portion crosses a straight line parallel to the upper surface of the substrate at the cross-section.

In addition, when viewed in the propagation direction of light, that is, in the cross-sectional view taken by line A-A' passing through any position in the Y-axis direction of the optical waveguide and perpendicular to the propagation of light at this position, angle α2 formed by side surface S33' of the uppermost segment of ridge portion 2*r'* and upper surface S1 of substrate 1 is preferably greater than 0 degree and is 80 degrees or less.

In addition, angle α1 formed by lower side surface S31' of ridge portion 2*r'* and upper surface S1 of substrate 1 is larger than angle β formed by side surface S32' of the second segment of ridge portion 2*r'* and upper surface S1 of substrate 1. Angle β formed by side surface S32' of the second segment of ridge portion 2*r'* and upper surface S1 of substrate 1 is larger than angle α3 formed by side surface S33' of the uppermost segment of ridge portion 2*r'* and upper surface S1 of substrate 1. In other words, the angle formed by each of lower side surface S31', upper side surface S32' and upper side surface S33' and upper surface S1 of substrate 1 becomes smaller as it goes up.

In addition, when viewed in the propagation direction of light, that is, in the cross-sectional view taken by A-A' line passing through any position in the Y-axis direction of the optical waveguide and perpendicular to the propagation of light at this position, the width T1 of the uppermost portion of ridge portion 2*r'* is smaller than the width T2 of the lowest portion of ridge portion 2*r'*, and is preferable 40%-75% of the width T2 of the lowest portion.

EXAMPLES

Figure 7:
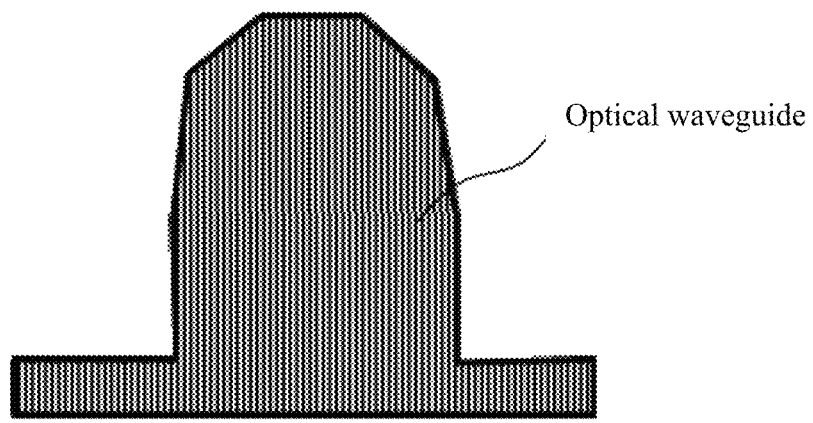
FIG. 7 is a cross-sectional view showing the cross-sectional shape of the optical waveguide of Example 3 of the present invention.
Figure 8:
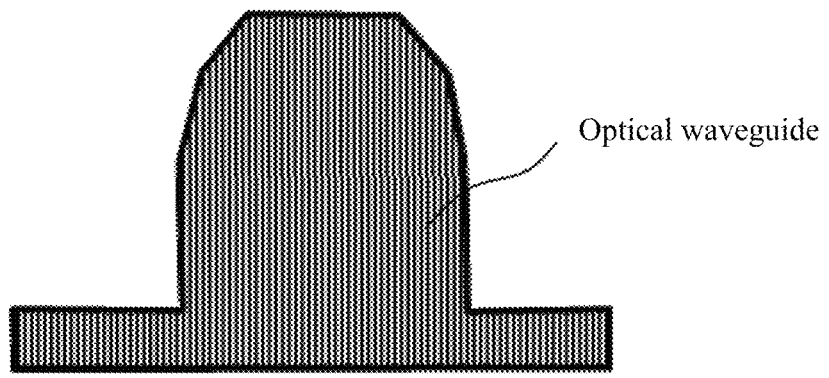
FIG. 8 is a cross-sectional view showing the cross-sectional shape of the optical waveguide of Example 4 of the present invention.
Figure 9:
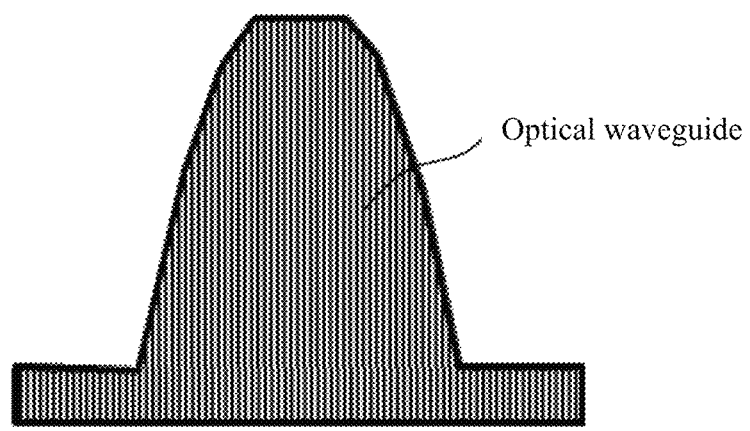
FIG. 9 is a cross-sectional view showing the cross-sectional shape of the optical waveguide of Example 5 of the present invention.
Figure 10:
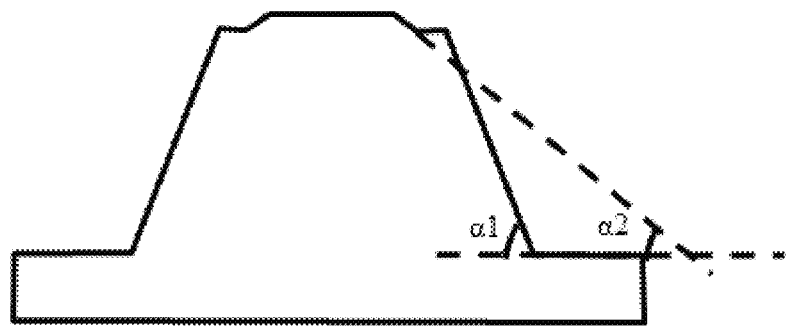
FIG. 10 is a cross-sectional view showing the cross-sectional shape of the optical waveguide of Example 6 of the present invention.
Figure 11:
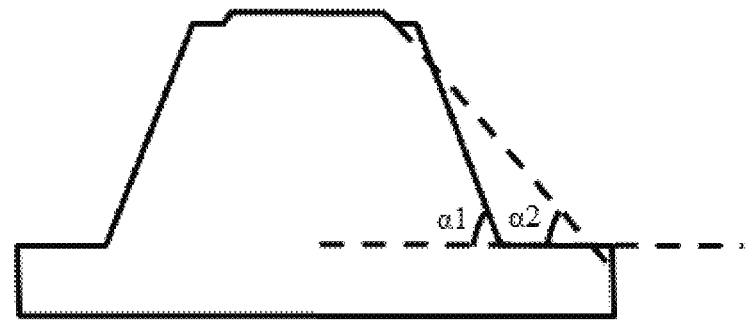
FIG. 11 is a cross-sectional view showing the cross-sectional shape of the optical waveguide of Example 7 of the present invention.
Figure 12:
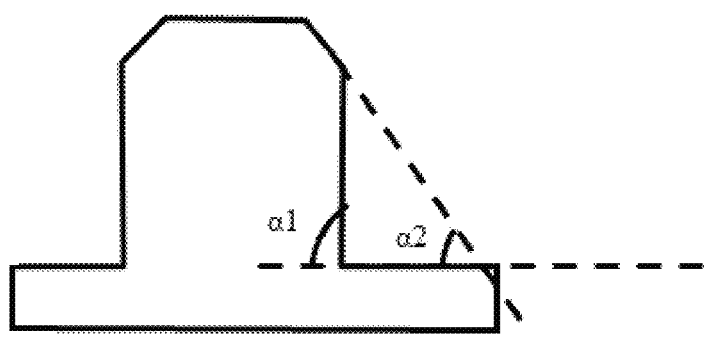
FIG. 12 is a cross-sectional view showing the cross-sectional shape of the optical waveguide of Example 8 of the present invention.
Figure 13:
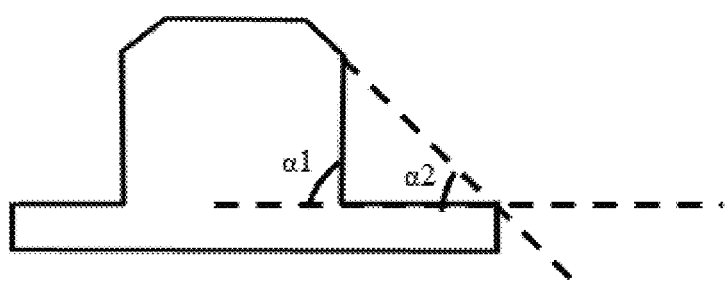
FIG. 13 is a cross-sectional view showing the cross-sectional shape of the optical waveguide of Example 9 of the present invention.

Examples 1-11 of the optical waveguides having cross-sectional shapes shown in Table 1 (optical waveguides shown in FIG. 5 to FIG. 13) and Comparative example 1 (an optical waveguide without a slope change point in which cross-sectional shape is rectangular) are produced respectively, and their Vπ(V)@1550 nm as an indicator of the electric field efficiency and propagation loss (PL) (dB/cm) are measured, and the result is shown in Table 1. In addition, as shown in FIGS. 5-6 and 12-13, the shapes of the optical waveguides of Examples 1-2 and 8-9 correspond to the first embodiment, the shapes of the optical waveguides of Examples 10-11 are the same as those of Examples 1-2 and 8-9, corresponding to the first embodiment, and as shown in FIGS. 7-9, the shapes of the optical waveguides of Examples 3-5 correspond to the second embodiment. In addition, as shown in FIGS. 10 to 11, in Examples 6 to 7, the shape of the optical waveguide is stepped, and the upper corner is cut off. In addition, in Table 1, the position of the initial slope change point (the generation point of $\alpha 1$ or $\beta$) from the substrate is represented by the ratio when the height of the optical waveguide is set to 100%. And the position of the initial slope change point (the generation point of $\alpha 2$) from the uppermost portion of the optical waveguide is represented by the ratio when the height of the optical waveguide is set to 100%. In addition, $(1.98\text{-PL})/V\pi$ is represented. According to the data, $V\pi$ which is preferably taken as a small value, is set as the denominator, and the value preferably having a large value (representing the comparative value of the propagation amount in which the loss amount is subtracted relative to characteristic 1.98 of Comparative example 1) is set as the molecule. Therefore, the larger the value of $(1.98\text{-PL})/V\pi$, the better the balance of the values of $V\pi$ and PL are.

For example, in the above embodiment, an optical modulator provided with a pair of optical waveguides 10*a* and 10*b* formed of the lithium niobate film epitaxially grown on substrate 1 is given. However, the present invention is not limited to this structure, and it may be also a modulator in which the optical waveguide is formed of electro-optical materials such as barium titanate, lead zirconate titanate etc. In addition, Semiconductor materials, polymer materials etc. with electro-optical effect can also be used as waveguide layer 2.

In addition, in the above embodiment, an example, that the side surface of the ridge portion has one slope change point and two slope change points respectively, is given. However, the side surface of the ridge portion can also have three or more slope change points.

In addition, in the above embodiment, a pair of optical waveguides 10*a* and 10*b* are given. However, as long as the function of optical communication or optical measurement can be achieved, only one optical waveguide can be provided, or three or more optical waveguides can be also provided.

Figure 14:
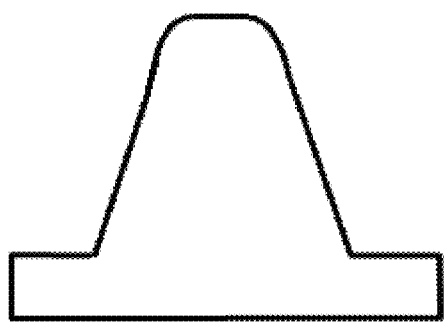
FIG. 14 is a cross-sectional view showing the cross-sectional shape of the optical waveguide according to another modification of the present invention.

In addition, in the above embodiment, the side surface of the ridge is composed of multiple straight lines, but it is not limited to this. As shown in FIG. 14, there is also a case

TABLE 1

| | Example 1 | Example 2 | Example 3 | Example 4 | Example 5 | Example 6 | Example 7 | Example 8 | Example 9 | Example 10 | Example 11 | Comparative example 1 |
|---|---|---|---|---|---|---|---|---|---|---|---|---|
| $\alpha 1$ | 90 | 90 | 90 | 90 | 78 | 68 | 68 | 90 | 90 | 60 | 80 | — |
| $\beta$ | — | — | 80 | 80 | 65 | — | — | — | — | — | — | — |
| $\alpha 2$ | 60 | 52 | 42 | 50 | 50 | 39 | 48 | 80 | 44 | 10 | 10 | — |
| the position of the initial slope change point (the generation point of $\alpha 1$ or $\beta$) from the substrate (the ratio of the height of the optical waveguide) (%) | 80 | 65 | 46 | 59 | 65 | 96 | 96 | 65 | 85 | 98 | 98 | 100 |
| the position of the initial slope change point (the generation point of $\alpha 2$) from the uppermost portion of the substrate (the ratio of the height of the optical waveguide) (%) | 80 | 65 | 85 | 85 | 90 | 96 | 96 | 65 | 85 | 98 | 98 | 100 |
| PL (dB/cm) | 1.56 | 1.55 | 1.60 | 1.55 | 1.59 | 1.65 | 1.67 | 1.58 | 1.54 | 1.69 | 1.62 | 1.98 |
| $V\pi$ (V) @1550 nm | 2.75 | 2.78 | 2.82 | 2.8 | 2.8 | 2.8 | 2.8 | 2.8 | 2.8 | 2.82 | 2.82 | 2.8 |
| $(1.98 - \text{PL})/V\pi$ | 0.153 | 0.137 | 0.135 | 0.154 | 0.139 | 0.118 | 0.111 | 0.143 | 0.157 | 0.103 | 0.128 | 0.000 |

According to Table 1 above, by making the angle $\alpha 1$ formed by the lower side surface of the optical waveguide and the upper surface of the substrate be 60 degrees or more and the angles $\alpha 2$ formed by the side surface of the uppermost segment of the optical waveguide and the upper surface of the substrate be larger than 0 degree and 80 degrees or less, the light propagation loss can be more effectively reduced while basically maintaining the low driving voltage.

The height of the initial slope change point from the substrate is preferably 50% or more of the height of the optical waveguide, more preferably 59%-85%.

The height of the initial slope change point from the top of the optical waveguide is preferably 60% or more of the height of the optical waveguide, more preferably 80%-90%.

The preferable embodiment of the present invention is illustrated above, but the present invention is not limited to the above embodiment, and various changes can be made without departing from the gist of the present invention, and they are also included in the scope of the present invention.

where one or more among the lines constituting the side surface of the ridge portion become a curve.

In addition, in the above embodiment, an example of applying the present invention to the optical modulator is given. However, the present invention can also be applied to any electro-optical devices which can achieve optical communication or optical measurement, such as optical switches, optical resonators, optical branch circuits, sensor elements, millimeter wave generators etc.

The invention claimed is:
1. An electro-optical device comprising:
 a substrate, an optical waveguide formed on the substrate,
  a buffer layer formed on the substrate and provided so as to cover the optical waveguide, and an electrode formed on the buffer layer,
 wherein:
  the optical waveguide includes:
   a waveguide layer portion including a first side in contact with the substrate and a second side opposite to the first side along a thickness direction, the thickness direction being parallel to a direction along which the substrate, the optical waveguide, the buffer layer, and the electrode are stacked, an entirety of the first side of the waveguide layer portion extending along a plane that is transverse to the thickness direction, and a ridge portion extending from the second side of the waveguide layer portion towards the electrode along the thickness direction, the ridge portion being opposite to the first side of the waveguide layer portion along the thickness direction, the ridge portion including a side surface extending directly from the second side of the waveguide layer portion to an end surface of the ridge portion, the side surface of the ridge portion being transverse to the second side of the waveguide layer portion, and when viewed in a propagation direction of light, the side surface of the ridge portion of the optical waveguide includes:

a plurality of slope change points starting at a position that is 50% or more of a maximum thickness of the optical waveguide starting from the first side of the waveguide layer portion and extending towards the end surface of the ridge portion along the thickness direction, and a plurality of straight lines extending between the slope change points, wherein angles formed by the plurality of straight lines and a first surface of the substrate decrease in a direction extending from the second side of the waveguide layer portion towards the end surface of the ridge portion along the thickness direction.

2. The electro-optical device according to claim 1, wherein the side surface of the ridge portion includes a first segment that directly extends from the second side of the waveguide layer portion to a point that is positioned in between the second side of the waveguide layer portion and the end surface of the ridge portion along the thickness direction, and when viewed in the propagation direction of light, an angle formed by the first segment of the side surface of the ridge portion and the first surface of the substrate is 60 degrees or more, the first surface of the substrate being in contact with the first side of the waveguide layer portion.

3. The electro-optical device according to claim 1, wherein a width of the end surface of the ridge portion of the optical waveguide is in a range of 40% to 75% of a width of a portion of the ridge portion that directly extends from the second side of the waveguide layer portion to a position that is in between the second side of the waveguide layer portion and the end surface of the ridge portion along the thickness direction, the width being transverse to the thickness direction.

4. The electro-optical device according to claim 1, wherein the side surface of the ridge portion includes a second segment that directly extends from the end surface to a point that is positioned in between the second side of the waveguide layer portion and the end surface of the ridge portion along the thickness direction, and when viewed in the propagation direction of light, an angle formed by the second segment of the side surface of the ridge portion and the first surface of the substrate is larger than 0 degree and is 80 degrees or less, the first surface of the substrate being in contact with the first side of the waveguide layer portion.

5. The electro-optical device according to claim 1, wherein the optical waveguide is a film composed of $LiNbO_3$ or $LiTaO_3$.

6. The electro-optical device according to claim 1, wherein the optical waveguide is a film formed by doping $LiNbO_3$ with at least one element selected from Ti, Mg, Zn, In, Sc, Er, Tm, Yb and Lu.

7. The electro-optical device according to claim 1, wherein the optical waveguide is an epitaxial film.

8. The electro-optical device according to claim 7, wherein a crystal orientation of the epitaxial film is along a direction intersecting with the substrate.

9. The electro-optical device according to claim 1, wherein the side surface of the ridge portion includes:
a first segment that directly extends from the second side of the waveguide layer portion to a point that is positioned in between the second side of the waveguide layer portion and the end surface of the ridge portion along the thickness direction, and
a second segment that directly extends from the end surface of the ridge portion to a point that is positioned in between the second side of the waveguide layer portion and the end surface of the ridge portion along the thickness direction, when viewed in the propagation direction of light, a first angle formed by the first segment of the side surface and the first surface of the substrate is 60 degrees or more, and a second angle formed by the second segment of the side surface and the first surface of the substrate is larger than 0 degree and is 80 degrees or less, and the first angle is larger than the second angle, and the first surface of the substrate is in contact with the first side of the waveguide layer portion.

10. The electro-optical device according to claim 9, wherein the side surface of the ridge portion extends continuously along a plane from the second side of the waveguide layer portion to a first slope change point that is at the position of 50% or more of the maximum thickness of the optical waveguide starting from the first side of the waveguide layer portion and extending to the end surface of the ridge portion along the thickness direction.

11. The electro-optical device according to claim 1, wherein the first surface of the substrate is in contact with the first side of the waveguide layer portion, and an entirety of the first surface of the substrate extends along a plane that is transverse to the thickness direction.

12. The electro-optical device according to claim 11, wherein the ridge portion is opposite to the first surface of the substrate along the thickness direction.

13. The electro-optical device according to claim 1, wherein the side surface of the ridge portion extends continuously along a plane from the second side of the waveguide layer portion to a first slope change point that is at the position of 50% or more of the maximum thickness of the optical waveguide starting from the first side of the waveguide layer portion and extending to the end surface of the ridge portion along the thickness direction.

* * * * *